(12) United States Patent
Jang et al.

(10) Patent No.: US 12,427,465 B2
(45) Date of Patent: Sep. 30, 2025

(54) FILTERS, FILTER SYSTEMS, AND METHODS OF USE

(71) Applicant: University of Florida Research Foundation, Inc., Gainesville, FL (US)

(72) Inventors: Myoseon Jang, Gainesville, FL (US); Zechen Yu, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 445 days.

(21) Appl. No.: 17/917,815

(22) PCT Filed: Apr. 2, 2021

(86) PCT No.: PCT/US2021/025504
§ 371 (c)(1),
(2) Date: Oct. 7, 2022

(87) PCT Pub. No.: WO2021/207012
PCT Pub. Date: Oct. 14, 2021

(65) Prior Publication Data
US 2023/0140619 A1 May 4, 2023

Related U.S. Application Data

(60) Provisional application No. 63/007,559, filed on Apr. 9, 2020.

(51) Int. Cl.
*B01D 46/00* (2022.01)
*B01D 39/20* (2006.01)
*G01N 21/78* (2006.01)

(52) U.S. Cl.
CPC ..... *B01D 46/0086* (2013.01); *B01D 39/2017* (2013.01); *G01N 21/78* (2013.01);
(Continued)

(58) Field of Classification Search
None
See application file for complete search history.

(56) References Cited

U.S. PATENT DOCUMENTS 9,272,075 B2 * 3/2016 Antoni ............... A61L 31/10
2004/0020367 A1 2/2004 Soane et al.
(Continued)

FOREIGN PATENT DOCUMENTS

KR 101772322 B1 * 8/2017

OTHER PUBLICATIONS

KR101772322B1_ENG (Espacenet machine translation of Kim) (Year: 2017).*
(Continued)

*Primary Examiner* — Gabriel E Gitman
(74) *Attorney, Agent, or Firm* — Thomas|Hostemeyer LLP

(57) ABSTRACT

The present disclosure provides for filters, filter systems, methods of using filter systems, and methods of detecting targeting airborne particles, and the like. The present disclosure provides for filters that can capture one or more types of targeted airborne particulates, where the presence of each of the targeted airborne particulates can then be detected. The filters can be used in industrial gas systems, laboratory gas systems, HVAC systems, portable filter systems, respirator systems, and other residential, commercial, or industrial air circulation or air control systems.

14 Claims, 2 Drawing Sheets

(52) U.S. Cl.
CPC ............ *B01D 2239/0421* (2013.01); *B01D 2239/0492* (2013.01); *B01D 2239/1216* (2013.01); *B01D 2239/1233* (2013.01); *B01D 2239/1291* (2013.01); *B01D 2273/26* (2013.01); *B01D 2279/50* (2013.01)

(56) References Cited

U.S. PATENT DOCUMENTS

| | | | |
|---|---|---|---|
| 2007/0042348 A1* | 2/2007 | Amano | G01N 21/783 |
| | | | 436/514 |
| 2010/0279427 A1 | 11/2010 | Jang | |
| 2010/0323573 A1 | 12/2010 | Chu et al. | |
| 2018/0074028 A1* | 3/2018 | Gerber | G01N 33/0054 |
| 2018/0074032 A1* | 3/2018 | Magee | G01N 33/0014 |
| 2019/0176095 A1* | 6/2019 | Jeong | B01D 69/1071 |
| 2020/0016545 A1* | 1/2020 | Seo | B32B 37/182 |

OTHER PUBLICATIONS

ATS Patient Information Series: Mechanical Ventilation. Accessed Feb. 19, 2025 at https://uthsc.edu/pulmonary/clinical-care/documents/mventilation.pdf (Year: 2005).*

ISR Mailed Jun. 23, 2021; Application No. PCT/US20221/25504, pp. 1-12.

* cited by examiner

FILTERS, FILTER SYSTEMS, AND METHODS OF USE

CLAIM OF PRIORITY TO RELATED APPLICATION

This application is the 35 U.S.C. § 371 national stage of pct application having serial number PCT/US2021/25504, filed on Apr. 2, 2021. The PCT application claims priority to and the benefit of U.S. provisional application entitled "FILTERS, FILTER SYSTEMS, AND METHODS OF USE" having Ser. No. 63/007,559 filed on Apr. 9, 2020, which is entirely incorporated herein by reference.

BACKGROUND

The detection of airborne particulates is of interest due to the damage the particulates can cause to the lungs. Particulates are a danger to humans and can be generated from a variety of sources and can remain suspended and infectious for long periods of time. Filtration is a common technique used for the detection of particulates.

SUMMARY

The present disclosure provides for filters, filter systems, methods of using filter systems, methods of detecting targeting airborne particles, and the like. In an aspect, the present disclosure provides for filters that can capture one or more types of targeted airborne particulates, where the presence of each of the targeted airborne particulates can then be detected. Embodiments of the present disclosure can be used in industrial gas systems, laboratory gas systems, HVAC systems, portable filter systems, respirator systems, and other residential, commercial, or industrial air circulation or air control systems.

In an aspect, the present disclosure provides for a filter, comprising: a plurality of filter fibers coated with a hydrogel material on the surface of the filter fibers, wherein the hydrogel material on the filter fibers have a hygroscopic characteristic. In an aspect, a first colorimetric composition can be disposed on the hydrogel material, where the first colorimetric composition has the characteristic of reacting with the targeted airborne particulates to provide a first detectable indication. The first detectable indication indicates the presence of the targeted airborne particulate captured by the filter, where the first colorimetric composition can be specific for a specific type of the targeted airborne particulate. The hydrogel material can be one of or a combination of: sodium polyacrylate, and polyacrylamide copolymer; polyvinyl alcohol; and hydroxyethylmethacrylate. The filter fibers can be one type or a combination of: glass, carbon, cellulose, quartz, and a polymeric material.

In another aspect, the present disclosure provides for methods of detecting targeted airborne particulates. The method includes providing a filter as described above or herein; trapping targeted airborne particulates in the filter; exposing the filter fibers to a first calorimetric composition, wherein the first colorimetric composition has the characteristic of reacting with the targeted airborne particulates to produce a first detectable indication; and measuring the first detectable indication, wherein detection of the first detectable indication confirms the presence of the targeted airborne particulates.

In another aspect, the present disclosure provides for methods of detecting targeted airborne particulates. The method includes providing a filter as described above or herein where a hydrogel material on the surface of the filter fibers; trapping targeted airborne particulates in the filter, wherein the first colorimetric composition has the characteristic of reacting with the targeted airborne particulates to a first detectable indication; and measuring the first detectable indication, wherein detection of the first detectable indication confirms the presence of the targeted airborne particulates.

In another aspect, the present disclosure provides for filter systems, comprising: a filter as described above and herein; and a detection system for measuring a first detectable indication, wherein detection of the first detectable indication confirms the presence of the targeted airborne particulate. In an aspect, the detection system is a spectrometer such as a UV spectrometer.

In an aspect, the present disclosure provides for an air filtration system comprising a filter such as that described above or provided herein. The air filtration system can be part of or one of the following: industrial gas systems, laboratory gas systems, HVAC systems, portable filter systems, respirator systems, and other residential, commercial, or industrial air circulation or air control systems.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1 illustrates a scheme describing the measurement of harmful species in aerosol.

FIG. 2 illustrates a calibration curve for the measurement of organic hydroperoxides.

DETAILED DESCRIPTION

Figure 3:
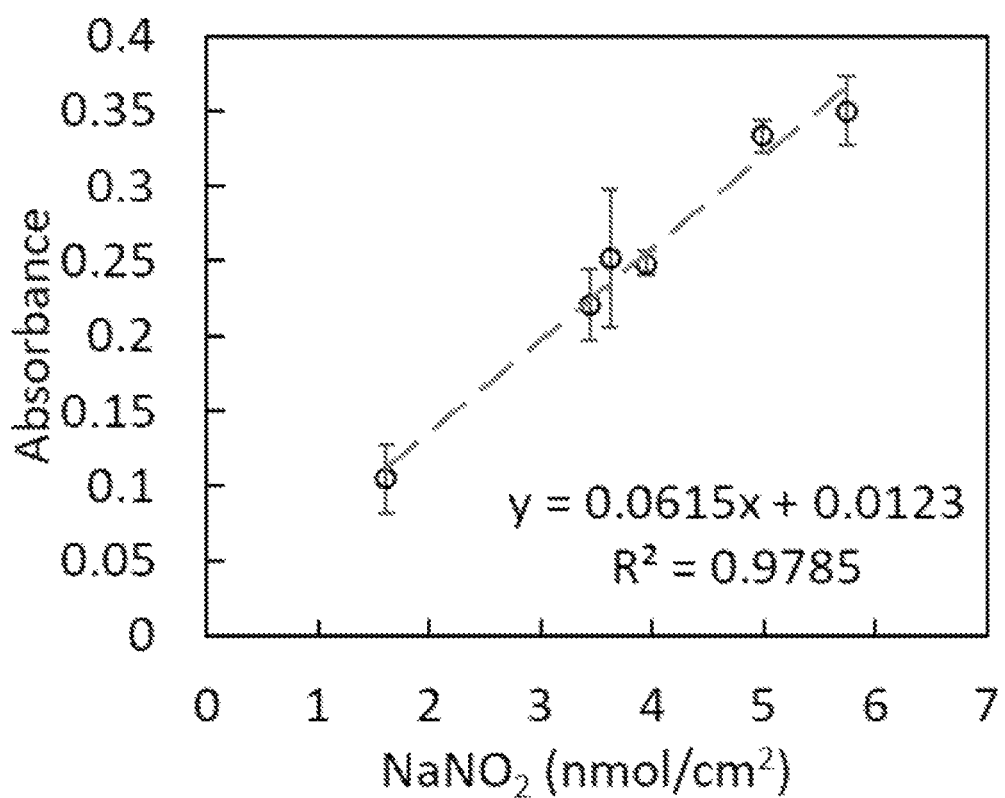
FIG. 3 illustrates a calibration curve for the measurement of peroxyacyl nitrate (PAN)-like species.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of environmental engineering, biology, molecular biology, chemistry, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DISCUSSION

In accordance with the purpose(s) of the present disclosure, as embodied and broadly described herein, embodiments of the present disclosure, in one aspect, relate to filters, filter systems, methods of using filter systems, and methods of detecting targeting airborne particles, and the like.

In an aspect, the present disclosure provides for filters that can capture one or more types of targeted airborne particulates, where the presence of each of the targeted airborne particulates can then be detected. The filter can include a plurality of filter fibers. The filter fibers can be coated with a hydrogel material on the surface of the filter fibers. The hydrogel material on the filter fibers has a hygroscopic characteristic that facilitates the reactions of the targeted airborne particulates with the chemical assay reagent. Embodiments of the present disclosure can be used in industrial gas systems, laboratory gas systems, HVAC systems, portable filter systems, respirator systems, and other residential, commercial, or industrial air circulation or air control systems.

In an embodiment, the targeted airborne particulates can include particulates, a virus, a microorganism (e.g., bacteria, fungi, protozoans, algae, spores of any of these, endospores of any of these, cysts of any of these) as well as volatile organic compounds (VOCs). The VOCs can include chemical warfare agents as well as the following: aldehydes, aliphatic nitrogen compounds, sulfur compounds, aliphatic oxygenated compounds, halogenated compounds, organophosphate compounds, phosphonothionate compounds, phosphorothionate compounds, arsenic compounds, chloroethyl compounds, phosgene, cyanic compounds, or combinations thereof. In particular, the particulates can include hydroperoxides and peroxyacyl nitrate (PAN)-like chemical species. The filter and filter system can be used to independently detect one or more types of targeted airborne particulates. Additional details about some particulates are provided in the Example.

The filter can be of any type for use in laboratory, residential, commercial, or industrial industries. The dimensions will depend upon the application. The filter can be constructed of appropriate materials for the selected application. In particular, the filter can include filter fibers of appropriate density for the air flow application. The filter fiber can be made of glass, carbon (e.g. carbon fibers or mats), cellulose, quartz, a polymeric material (e.g., cellulose, polytetrafluoroethylene (PTFE)), or a combination thereof. The dimension (e.g., diameter) of the filter fibers can be in the micrometer to millimeter range or higher for certain application. In an aspect, the filter fibers are glass filter fibers and have a diameter of about 0.3 to 3 micrometers. The aspect ratio of the fibers can be 1:50, 1:100, 1:1000, 1:5000, 1:10000, or 1:100000. The length of the fibers can be in the range of centimeters to meters as is appropriate for the desired application.

The filter fibers can be coated with a hydrogel material. The hydrogel material is selected from the group consisting of: sodium polyacrylate, and polyacrylamide copolymer; polyvinyl alcohol; and hydroxyethylmethacrylate. The thickness of the hydrogel coating can vary depending upon the application. In an aspect, the hydrogel coating can be about 5 to 10 micrometers, about 5 to 20 micrometers, about 10 to 30 micrometers, or about 10 to 40 micrometer thick. The filter can include coated filter fibers that are of dimensions so that appropriate air flow can be achieved for the selected application. About 25 to 100% or about 50 to 100% or about 80 to 100% of the surface area of the filter fibers in the filter are covered with the hydrogel material.

In addition, the filter can include one or more types of colorimetric compositions, where the colorimetric composition can be used to produce a detectable indication. The first colorimetric composition has the characteristic of reacting with the targeted airborne particulates to provide a first detectable indication, where the first detectable indication indicates the presence of the targeted airborne particulate captured by the filter. The type of colorimetric composition can be selected to be specific for a particular targeted airborne particulate. In this way, the filter can be used to capture a variety of targeted airborne particulates at once and subsequently detect each of them (e.g., in parallel or serially).

In an aspect, the colorimetric composition can be dispersed throughout the hydrogel material. In another aspect, the colorimetric composition can be disposed on the hydrogel material after the hydrogel material coats the filter fibers. In the second aspect, the colorimetric composition can disposed on the hydrogel before use of the filter or after applied after the filter is used and just prior to being examined for the presence of the targeted airborne particulate. The colorimetric composition can be added closer to the time that the filter we be examined so that the colorimetric composition or the reaction product of the colorimetric composition and the targeted airborne particulate do not degrade (e.g., the detectable indication is not longer detectable).

The filter can be used in a filter system, where in addition to the filter, a detection system is included. The detection system can measure the detectable indication(s), where when measured, the first detectable indication confirms the presence (and/or the concentration) of the targeted airborne particulate. The detection system can be a spectrometer, for example a UV spectrometer, fluorescent spectrometer, or the like depending on the reaction product. In an aspect, the measurement can be performed remotely using an imaging device to illustrate the detectable indication, where the imaging device is remotely interfaced with the detection device.

An aspect of the present disclosure provides for methods of detecting targeted airborne particulates. For example, the method includes trapping targeted airborne particulates in the filter. The filter may already include the calorimetric composition and if not, the filter fibers can be exposed to the calorimetric composition so colorimetric composition is present on the hydrogel and is capable of reacting with the targeted airborne particulates to produce the detectable indication. The detectable indication is measured using the detection system, and detection of the detectable indication confirms the presence of the targeted airborne particulates.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Figures 1, 2:
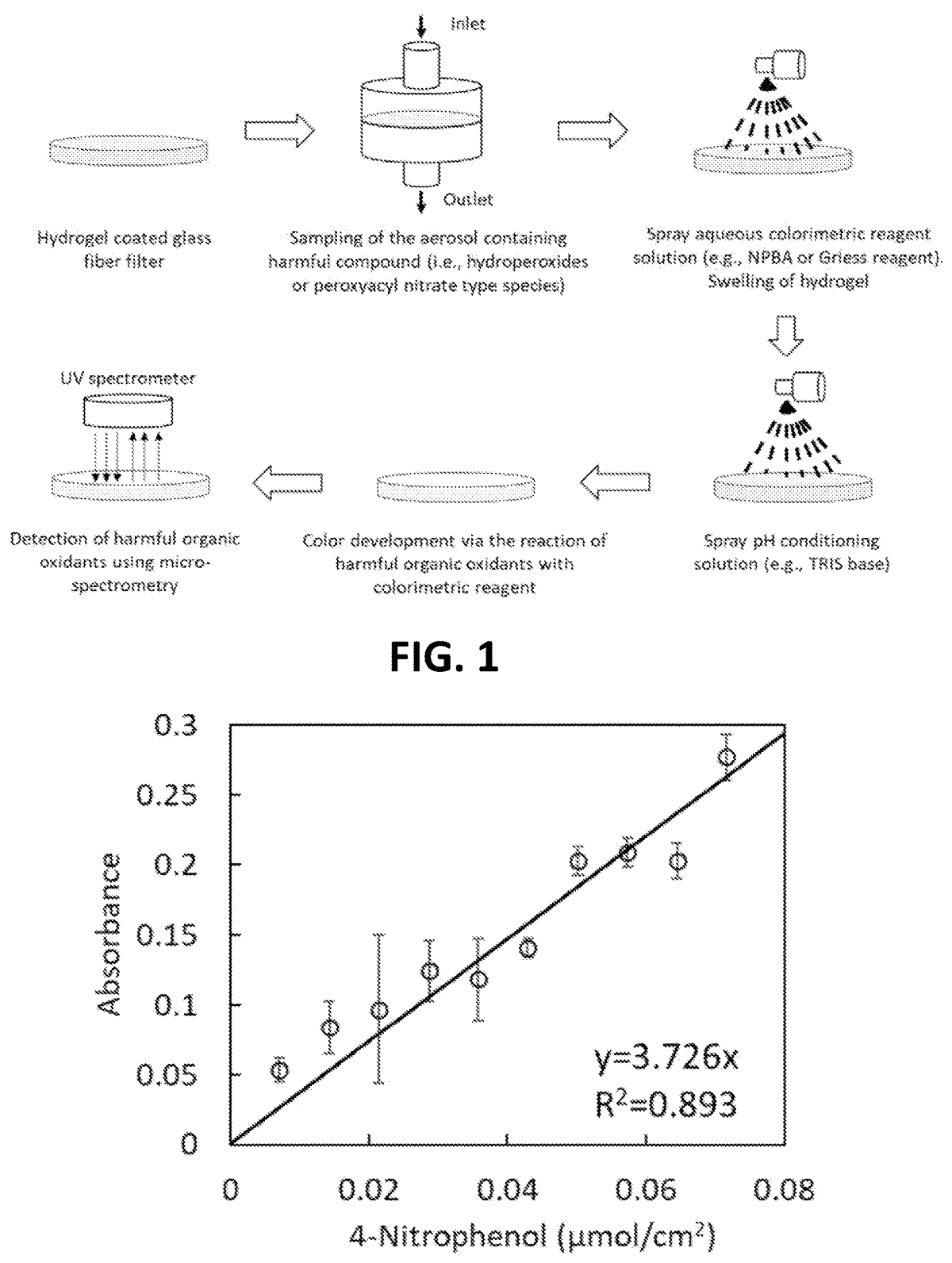

Airborne particulate matter contains various adverse chemical species which can impact on pulmonary and cardiovascular health. The invented online analytical method and technique can measure harmful chemical species in airborne particulate matter by using the hydrogel-coated filter integrated with different colorimetric assays that are specific to detect harmful chemical species. Unlike a dry filter, the hydrogel-coated filter can hold a large amount of moisture due to its hygroscopic property and is able to assist the colorimetric reaction between harmful chemical species and colorimetric reagents in the aqueous media driven by hydrogel. For preparing hydrogel coated filter, the commercialized air filter (e.g., glass fiber filters with 11 mm diameter and 1 μm pore size) is coated with hydrogel monomeric aqueous solution (e.g., 20% by weight of Subloc-1000, Susan Polymer Co., Ltd.) and then cured at 150 degree C. in oven for 10 minutes to form polymeric hydrogel. The resulted filter is used to collect airborne particles. After sampling aerosols, the aqueous colorimetric reagent solution (4 uL) is evenly sprayed onto the hydrogel coated filter using a flat spray nozzle. If necessary, the pH of hydrogel-coated filter is conditioned for the development of the color of chromophores in colorimetric reagents. The color development of the filter, which originates from the reaction of the harmful chemical species with the colorimetric reagent, is detected using an online micro-UV spectrometer (FIG. 1). This technique can be applied to detect harmful hydroperoxides (Case 1) or peroxyacyl nitrate (PAN)-like chemical species (Case 2).

Case 1. Online detection of hydroperoxides in aerosols (FIG. 2)
  Potential usage: oxidative stress on lung cells by hydroperoxides in airborne particles
  Colorimetric reagent: 4-nitrophenylboronic acid aqueous solution (2 mM).
  pH conditioning: TRIS base solution (20 mM).
  Maximum wavelength in the colorimetric analysis: 405 nm.
  Calibration method: 4-nitrophenol dying on hydrogel-coated filter.
  Detection limit: 10 nmol of 4-nitrophenol per hydrogen-coated filter.

Case 2. Online detection of PAN-like species in aerosols (FIG. 3)
  Potential usage: eye-irritation, skin cancer, and oxidative stress on lung cells by PAN-like compounds in airborne particles
  pH pre-conditioning: spray KOH aqueous solution (50 mM) onto the aerosol sample to hydrolyze PANs by forming nitrite ions.
  Colorimetric reagent: Griess reagent (20 mM of sulfanilic acid mixed with 5 mM of N-(1-Naphthyl)ethylenediamine) to detect nitrite ions.
  Maximum wavelength in the colorimetric analysis: 541 nm.
  Calibration method: $NaNO_2$ with Griess reagent on hydrogel-coated filter.
  Detection limit: 2 nmol of $NaNO_2$ per hydrogen-coated filter.

Products:
  1. The analytical method that can measure harmful chemical species in airborne particulate matter.
  2. Online and portable air quality measurement.
  3. Application of hydrogel to the air filter.
  4. The analytical method without extraction of chemical species in aerosols.
  5. Online detection of hydroperoxides in aerosols using the hydrogen-coated filter integrated with the NPBA colorimetric assay.
  6. Online detection of PAN-like species in aerosols using the hydrogen-coated filter integrated with Griess colorimetric assay.
  7. Extension of the method to the detection of harmful gaseous compounds in ambient air
  8. Extension of the detection method to Light-emitting diode (LED) and Charge-coupled device (CCD)
  9. Applying to different hydrogels It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A filter, comprising:
a plurality of filter fibers coated with a hydrogel material on the surface of the filter fibers, wherein the hydrogel material on the filter fibers has a hygroscopic characteristic, wherein the hydrogel material is selected from the group consisting of: polyacrylamide copolymer and hydroxyethylmethacrylate, wherein the hydrogel material coated on the filter fibers is about 5 to 10 micrometers thick.

2. The filter of claim 1, further comprising a first colorimetric composition disposed on the hydrogel material, wherein the first colorimetric composition has the characteristic of reacting with a plurality of targeted airborne particulates to provide a first detectable indication, wherein the first detectable indication indicates the presence of the targeted airborne particulates captured by the filter.

3. The filter of claim 1, wherein the filter fibers are selected from the group consisting of: glass, carbon, cellulose, quartz, a polymeric material, and a combination thereof.

4. The filter of claim 1, wherein about 50 to 100% of the surface area of the filter fibers is covered with the hydrogel material.

5. The filter of claim 2, wherein the first colorimetric composition is specific for a specific type of the targeted airborne particulate.

6. An air filtration system comprising the filter of claim 1.

7. The air filtration system of claim 6, wherein the air filtration system is an HVAC system.

8. The air filtration system of claim 6, wherein the air filtration system is a respirator system.

9. A method of detecting targeted airborne particulates, comprising:
providing the filter of claim 2;
trapping the targeted airborne particulates in the filter, wherein the first colorimetric composition has the characteristic of reacting with the targeted airborne particulates to cause the first detectable indication; and
measuring the first detectable indication to confirm the presence of the targeted airborne particulates.

10. The method of claim 9, wherein the measuring is performed by a spectrometer.

11. A filter system, comprising:
the filter of claim 1; and
a detection system for measuring a first detectable indication to confirm the presence of the targeted airborne particulates.

12. The method of claim 11, wherein the detection system includes a spectrometer.

13. A method of detecting targeted airborne particulates, comprising:
providing a filter, wherein the filter, comprises a plurality of filter fibers coated with a hydrogel material on the surface of the filter fibers, wherein the hydrogel material on the filter fibers has a hygroscopic characteristic;
trapping targeted airborne particulates in the filter;
exposing the filter fibers to a first colorimetric composition, wherein the first colorimetric composition reacts with the targeted airborne particulates to produce a first detectable indication; and
measuring the first detectable indication to confirm the presence of the targeted airborne particulates.

14. The method of claim 13, wherein the measuring is performed by a spectrometer.

* * * * *